US012602370B1

(12) United States Patent　　(10) Patent No.: US 12,602,370 B1
　　Eisenstadt et al.　　(45) Date of Patent: Apr. 14, 2026

---

(54) DETECTING CONFLICTING KNOWLEDGE IN DATA SOURCES

(71) Applicant: MICROSOFT TECHNOLOGY LICENSING, LLC., Redmond, WA (US)

(72) Inventors: Roy Eisenstadt, Tel Aviv (IL);
Alexander Ostrikov, Herzliya (IL);
Alexander Tsvetkov, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/987,974

(22) Filed: Dec. 19, 2024

(51) Int. Cl.
　　*G06F 16/23*　　(2019.01)
　　*G06F 16/93*　　(2019.01)

(52) U.S. Cl.
　　CPC .......... *G06F 16/2365* (2019.01); *G06F 16/93* (2019.01)

(58) Field of Classification Search
　　CPC .............................. G06F 16/2365; G06F 16/93
　　See application file for complete search history.

(56) References Cited

U.S. PATENT DOCUMENTS

| | | | | |
|---|---|---|---|---|
| 10,762,438 | B1 * | 9/2020 | Zhang | ..................... G06N 20/00 |
| 2017/0091170 | A1 * | 3/2017 | Cardillo | ................... G06F 40/56 |
| 2018/0349754 | A1 * | 12/2018 | Kumar | ................... H04L 51/02 |
| 2021/0406735 | A1 * | 12/2021 | Nahamoo | ......... G06F 16/24522 |
| 2023/0205824 | A1 * | 6/2023 | Jablokov | ................ G06F 16/93 |
| | | | | 707/737 |
| 2024/0202448 | A1 * | 6/2024 | Suppa | ................... G06F 40/284 |
| 2024/0265041 | A1 * | 8/2024 | Rennie | ..................... G06N 5/04 |
| 2025/0342188 | A1 * | 11/2025 | Vahdat | ............... G06F 16/3344 |

OTHER PUBLICATIONS

Bachina, et al., "Ensemble ALBERT and RoBERTa for Span Prediction in Question Answering," Proceedings of the 1st Workshop on Document-grounded Dialogue and Conversational Question Answering, 2021, pp. 1-6.

Hearst, Marti A., "TextTiling: Segmenting Text into Multiparagraph Subtopic Passages," in Computational Linguistics, vol. 23, Issue 1, Mar. 1997, pp. 33-64.

Khanna, et al., "Transformer-based Language Models for Factoid Question Answering at BioASQ9b," arxiv.org, Sep. 15, 2021, 11 pages.

(Continued)

*Primary Examiner* — Merilyn P Nguyen
(74) *Attorney, Agent, or Firm* — Seed Intellectual Property Law Group LLP

(57) ABSTRACT

A knowledge source is analyzed using machine learning models to detect conflicting or contradictory data in the documents of the knowledge source. The documents in a knowledge source are partitioned into non-overlapping, contiguous text segments containing a unique topic. Questions are generated for each text segment from a generative language model. Factoid answers are generated for each question from a question answering language model. Similar pairs of questions are identified from the answers of each question. A natural language inference model determines whether the answers to the similar questions are contradictory. A remedy is generated to address the documents having the contradictory or conflicting segments.

20 Claims, 7 Drawing Sheets

CONFLICTING KNOWLEDGE DETECTION SYSTEM 100

(56) References Cited

OTHER PUBLICATIONS

Reimers, et al., "Sentence-BERT: Sentence Embeddings using Siamese BERT-Networks", In Proceedings of the 2019 Conference on Empirical Methods in Natural Language Processing and the 9th International Joint Conference on Natural Language Processing, 2019, pp. 3982-3992.

Sherman, et al., "Using Hidden Markov Models for Topic Segmentation of Meeting Transcripts," IEEE Spoken Language Technology Workshop, 2008, pp. 1-4.

Weissenborn, et al., "FastQA: A Simple and Efficient Neural Architecture for Question Answering," arxiv.org, Mar. 14, 2017, 10 pages.

Weissenborn, et al., "Making Neural QA as Simple as Possible but not Simpler," Proceedings of the 21st Conference on Computational Natural Language Learning, Aug. 2017, pp. 271-280.

"Cosine Similarity—Wikipedia", Retrieved from: https://en.wikipedia.org/wiki/Cosine_similarity, May 24, 2025, 08 Pages.

"Levenshtein Distance—Wikipedia", Retrieved from: https://en.wikipedia.org/wiki/Levenshtein_distance, Jun. 28, 2025, 08 Pages.

International Search Report and Written Opinion received for PCT Application No. PCT/US2025/051169, Mar. 5, 2026, 13 pages.

Pan et al., "On the Risk of Misinformation Pollution with Large Language Models", In the Findings of the Association for Computational Linguistics: EMNLP, Dec. 2023, pp. 1389-1403.

* cited by examiner

200

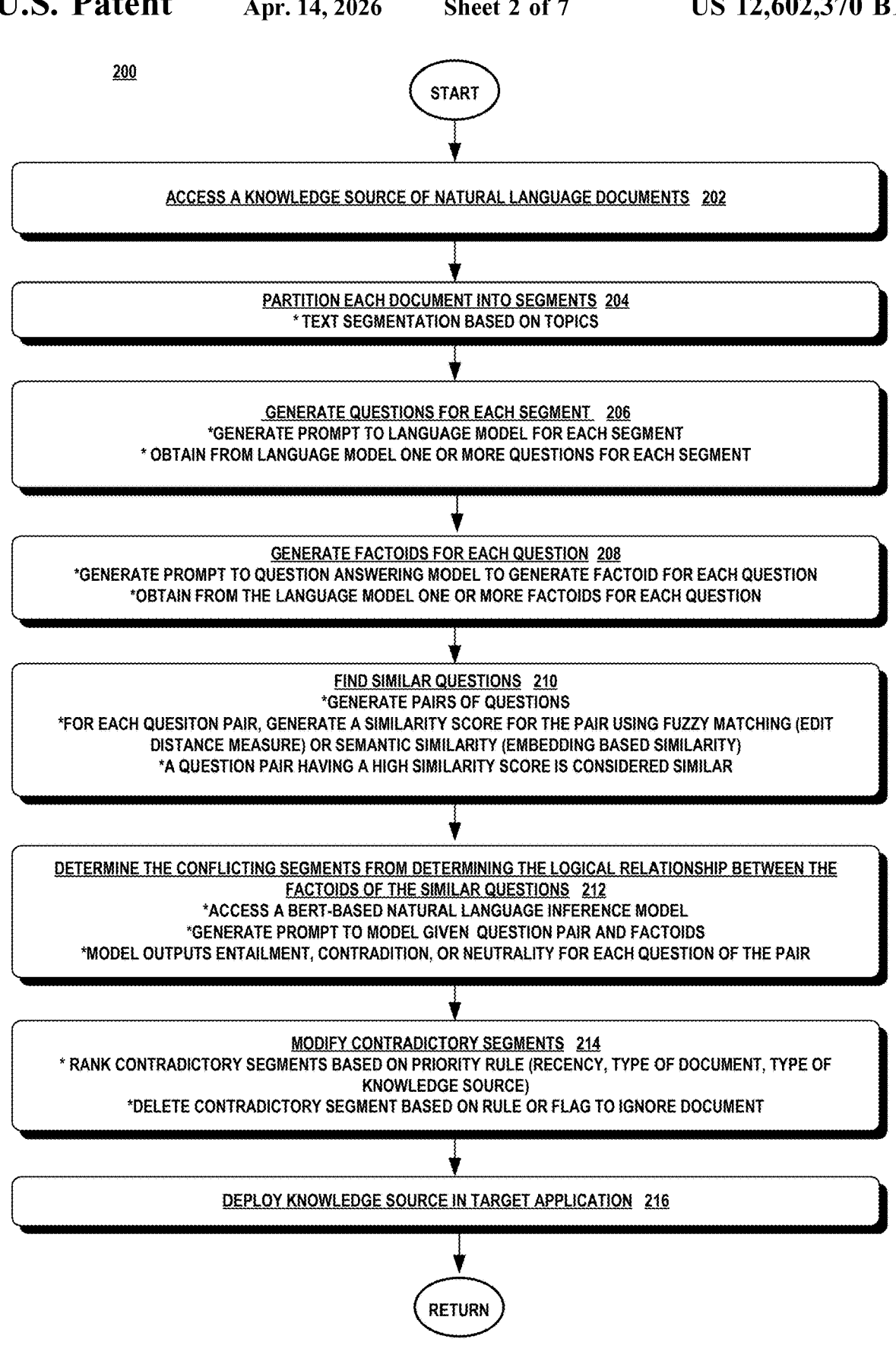

START

ACCESS A KNOWLEDGE SOURCE OF NATURAL LANGUAGE DOCUMENTS  202

PARTITION EACH DOCUMENT INTO SEGMENTS  204
* TEXT SEGMENTATION BASED ON TOPICS

GENERATE QUESTIONS FOR EACH SEGMENT   206
*GENERATE PROMPT TO LANGUAGE MODEL FOR EACH SEGMENT
* OBTAIN FROM LANGUAGE MODEL ONE OR MORE QUESTIONS FOR EACH SEGMENT

GENERATE FACTOIDS FOR EACH QUESTION  208
*GENERATE PROMPT TO QUESTION ANSWERING MODEL TO GENERATE FACTOID FOR EACH QUESTION
*OBTAIN FROM THE LANGUAGE MODEL ONE OR MORE FACTOIDS FOR EACH QUESTION

FIND SIMILAR QUESTIONS   210
*GENERATE PAIRS OF QUESTIONS
*FOR EACH QUESITON PAIR, GENERATE A SIMILARITY SCORE FOR THE PAIR USING FUZZY MATCHING (EDIT DISTANCE MEASURE) OR SEMANTIC SIMILARITY (EMBEDDING BASED SIMILARITY)
*A QUESTION PAIR HAVING A HIGH SIMILARITY SCORE IS CONSIDERED SIMILAR

DETERMINE THE CONFLICTING SEGMENTS FROM DETERMINING THE LOGICAL RELATIONSHIP BETWEEN THE FACTOIDS OF THE SIMILAR QUESTIONS  212
*ACCESS A BERT-BASED NATURAL LANGUAGE INFERENCE MODEL
*GENERATE PROMPT TO MODEL GIVEN  QUESTION PAIR AND FACTOIDS
*MODEL OUTPUTS ENTAILMENT, CONTRADITION, OR NEUTRALITY FOR EACH QUESTION OF THE PAIR

MODIFY CONTRADICTORY SEGMENTS  214
* RANK CONTRADICTORY SEGMENTS BASED ON PRIORITY RULE (RECENCY, TYPE OF DOCUMENT, TYPE OF KNOWLEDGE SOURCE)
*DELETE CONTRADICTORY SEGMENT BASED ON RULE OR FLAG TO IGNORE DOCUMENT

DEPLOY KNOWLEDGE SOURCE IN TARGET APPLICATION  216

RETURN

*FIG. 2*

DOCUMENT 1  302

Owning a domestic cat can bring years of joy and companionship. The lifespan of a cat depends on various factors, including its living conditions, diet, and overall health. While some cats may live only a few years due to poor health or environmental dangers, others thrive under proper care. Cats kept indoors are particularly known for their longevity, as they face fewer risks.

Domestic cats typically live for 12-15 years, with proper care and nutrition. Cats kept indoors often live longer than those allowed to roam outdoors, as they are less exposed to risks such as accidents or diseases.

DOCUMENT 2  304

The longevity of a domestic cat is heavily influenced by its environment and care. Indoor cats, for example, enjoy the benefits of a controlled, safe environment. With advances in veterinary medicine and the availability of premium diets, many cats now live significantly longer than in the past.

While many domestic cats live between 15-20 years, some can reach their 20s, particularly if kept indoors and provided with a high-quality diet and regular veterinary care. Outdoor cats, however, usually have shorter lifespans.

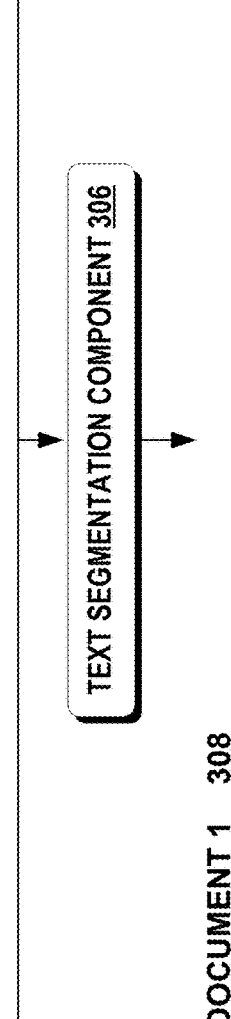

TEXT SEGMENTATION COMPONENT 306

SEGMENT 1 FOR DOCUMENT 1   308

Domestic cats typically live for 12-15 years, with proper care and nutrition. Cats kept indoors often live longer than those allowed to roam outdoors, as they are less exposed to risks such as accidents or diseases.

SEGMENT 2 FOR DOCUMENT 2   310

While many domestic cats live between 15-20 years, some can reach their 20s, particularly if kept indoors and provided with a high-quality diet and regular veterinary care. Outdoor cats, however, usually have shorter lifespans.

*FIG. 3A*

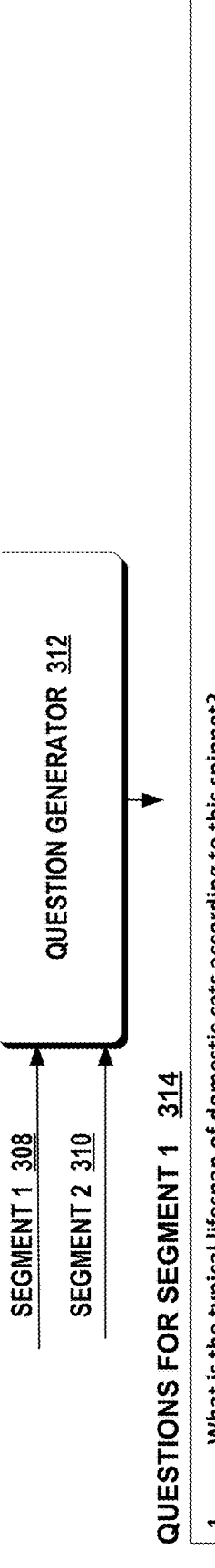

QUESTION GENERATOR 312

SEGMENT 1 308

SEGMENT 2 310

QUESTIONS FOR SEGMENT 1 314

1. What is the typical lifespan of domestic cats according to this snippet?

2. Why do indoor cats tend to live longer than outdoor cats?

QUESTIONS FOR SEGMENT 2 316

1. How long do many domestic cats live under optimal care?

2. What factors contribute to the longevity of indoor cats compared to outdoor cats?

FACTOID ANSWER ENGINE 318

SEGMENT 1 QUESTIONS 314 and SEGMENT 1 308

SEGMENT 2 QUESTIONS 316 and SEGMENT 2 310

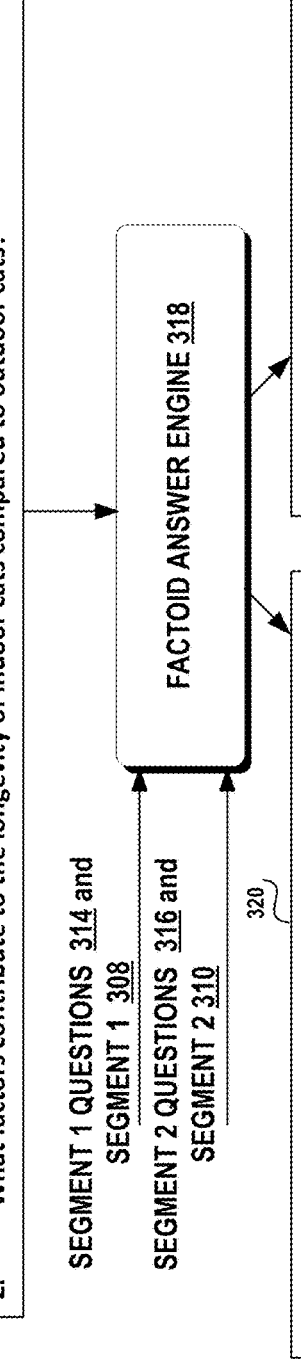

Questions and Factoid Answers from Snippet 1:

1. *What is the typical lifespan of domestic cats according to this snippet?*
   Answer: Domestic cats typically live for 12-15 years.

2. *Why do indoor cats tend to live longer than outdoor cats?*
   Answer: Indoor cats live longer because they are less exposed to risks such as accidents or diseases.

320

Questions and Factoid Answers from Snippet 2:

1. *How long do many domestic cats live under optimal care?*
   Answer: Many domestic cats live between 15-20 years under optimal care.

2. *What factors contribute to the longevity of indoor cats compared to outdoor cats?*
   Answer: Indoor cats benefit from a controlled, safe environment, a high-quality diet, and regular veterinary care, which contribute to their longevity.

DETECTING CONFLICTING KNOWLEDGE IN DATA SOURCES

BACKGROUND

A knowledge source is a collection of natural language documents used in several applications as a basis for making decisions and solving problems. The knowledge source may be a website or database that contains electronic documents, such as articles, news reports, forum posts, readme documentation, blogs, e-books, user manuals, and the like.

Knowledge sources are often used to train machine learning models to learn to perform tasks that generates a natural language output. A machine learning model learns to produce the natural language output based on its training dataset which comes from various knowledge sources. The models are then used to make predictions for various applications, such as in question answering, information retrieval, machine translation, text classification, image captioning, document summarization, and others.

However, a knowledge source may contain contradicting or conflicting information due to inconsistencies, obsolete data or different perspectives. The conflicting information may lead to confusion, ambiguity, or incorrect answers for the end users of the applications developed with the knowledge source.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated system is provided for detecting conflicting data in a knowledge source. The documents in a knowledge source are partitioned into contiguous, non-overlapping segments that relate to a particular topic. Questions are generated for each segment from a generative language model. Factoid answers are generated for each question of each segment from a question answering language model. A similarity comparison is made of each question with every other question to identify pairs of similar questions. The pairs of similar questions and their corresponding answers are classified by a natural language interference model to identify whether the answers of the pair of similar questions are contradictory or not. The documents containing the conflicting segments are then identified and a remedial action is taken to address the contradictory data in the knowledge source.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2 is a flow chart illustrating an exemplary method of the system for detecting and remedying conflicting data in a knowledge source.

FIGS. 3A-3C are schematic diagrams illustrating an exemplary method for detecting a contradictory document in a knowledge source.

DETAILED DESCRIPTION

Overview

The subject matter disclosed pertains to an automated system for detecting conflicting data in a knowledge source and for providing a remedy for the conflicting data in the knowledge source. The technique disclosed identifies contradictory segments in the documents of a knowledge source based on differences in the answers to pairs of similar questions found in the documents in the knowledge source.

In one embodiment, a text segmentation process is used to extract segments from each document in the knowledge source where each segment relates to a common topic. Questions are generated for each segment from a generative language model. Factoid answers are generated for each question of each segment from a question answer language model. A factoid answer is a factual statement that answers a specific question. For example, for the question, "What currency is used in China?", the factoid answer is "The yuan."

Pairs of similar questions are identified in the documents. The pairs of similar questions and their corresponding answers are classified by a neural language interference model to identify whether the factoid answers of the paired questions are contradictory. The documents containing the segments of the contradictory factoid answers are considered conflicting.

In an aspect, one of the conflicting documents is eliminated from the knowledge source based on a predetermined priority rule. The priority rule may be based on recency, the type of the source of the document, the type of the document, etc. The contradictory or conflicting documents are ranked based on the priority and one of the documents is either removed from the knowledge source or eliminated from retrieval.

Attention now turns to a system, device, and method for determining contradictory information in a knowledge source.

System

Figure 1:
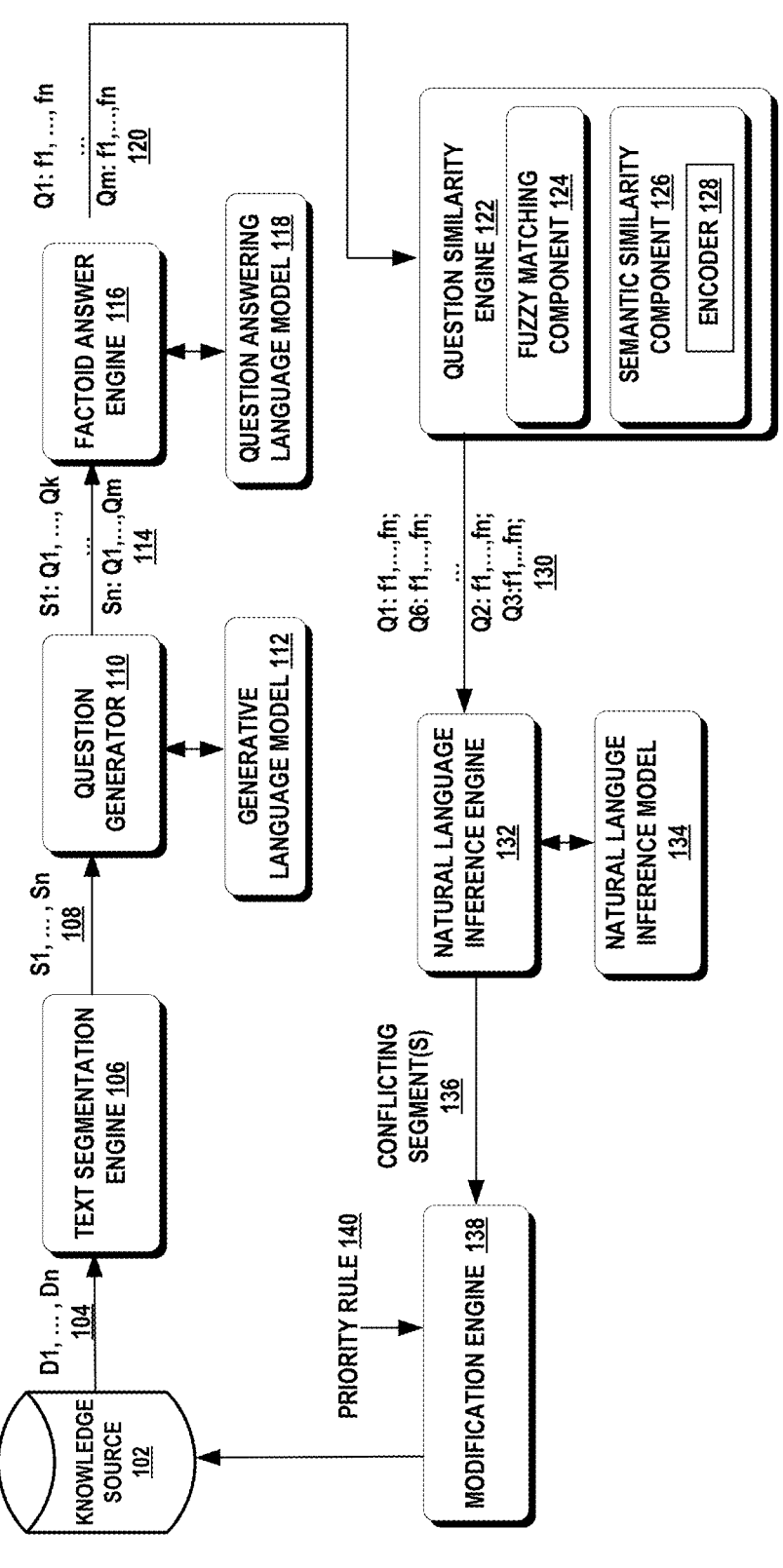
FIG. 1 illustrates an exemplary system for detecting and remedying conflicting data in a knowledge source.

FIG. 1 represents an exemplary system 100 for detecting and remedying contradictory statements in a knowledge source. In an aspect, the system 100 includes a knowledge source 102, a text segmentation engine 106, a question generator 110, a factoid answer engine 116, a question similarity engine 122, a natural language inference engine 132, and a knowledge source modification engine 138.

A knowledge source 102 is a collection of natural language documents 104 that is available electronically and used to train a language model for generating natural language text. A knowledge source 102 may be a collection of online documents curated from webpages, datasets licensed from third party providers, databases, electronic books, publicly available data from the internet, and the like.

Exemplary knowledge sources include, without limitation, the following:

Reuters Newswire Topic Classification which is a collection of news documents that appeared on Reuters in 1987;

IMDB Movie Review Sentiment Classification which is a collection of movie reviews from the website imdb.com and the positive and negative sentiments;

Project Gutenberg, a large collection of books that can be retrieved in plain text for a variety of languages;

Aligned Hansard of the 36$^{th}$ Parliament of Canada which is a collection of pairs of sentences in English and their corresponding translation in French;

Deepmind Question Answering Corpus which is a collection of questions with answers about new articles from the Daily Mail; and Amazon question/answer data which is a collection of questions and corresponding answers about Amazon product.

A text segmentation engine 106 uses a text segmentation algorithm to partition each document 104 of the knowledge source into text segments 108 where each text segment of a document is a contiguous, non-overlapping block of text that pertains to a same topic. In an aspect, the text segmentation engine 106 utilizes the TextTiling algorithm or the TextSplit algorithm to extract the segments from each document in the knowledge source.

The question generator 110 generates one or more questions Q1, . . . , Qm for each segment, S1, . . . , Sn. The question generator 110 formulates questions that pertain to the content of a segment. The questions are used to identify key points in a segment. In an aspect, the question generator 110 engages with a generative language model 112 to generate the questions for each segment 114.

The factoid answer engine 116 generates short and specific answers f1, . . . , fn to each question of a segment, Q1: f1, . . . , fn, . . . , Qm: f1, . . . , fn, 120. The factoid answer engine 116 uses a question answering language model 118 to find the exact span of text within a segment that represents the answer to the question.

In an aspect, a generative language model fine-tuned on a question-and-answer training dataset, such as the Stanford Questions Answer Dataset (SQUAD) is used as the question answering language model. Such models include BERT, A Robustly Optimized BERT Approach (RoBERTa), XLNet, and Google's T5. The factoid answer engine 116 outputs one or more factoids or answers for each question 120.

The question similarity engine 122 compares the similarity of pairs of the questions in all the documents and generates a score for each pair that represents a degree of similarity between the two questions in a pair. In one aspect, the fuzzy matching component 124 identifies the similarity based on an edit distance between the two paired questions and in another aspect, the semantic similarity component 126 identifies the similarity using embeddings of each question generated by an encoder 128.

The fuzzy matching component uses an approximate string-matching algorithm to determine the similarity between two strings of text, such as two questions. The two strings of text are scored based on a distance measure, such as a Hamming distance or a Levenshtein measure. The Hamming distance measures the number of words not present in both strings. The Levenshtein measure is an edit distance that measures the minimum number of edits (additions, deletions, replacements) needed to convert one string or question into the second string or question.

The semantic similarity component converts each question into an embedding using an encoder, such as Word2Vec or BERT. The embeddings of each question are compared with the embeddings of all other questions to determine how close each question is to every other question. Each comparison generates a score. Questions that are similar have a higher score than questions that are different.

The pairs of similar questions are then analyzed by the natural language inference engine 132. Natural language inference is the process of determining the logical relationship between two text sentences. A logical relationship exists if one question logically follows from the other question and this is considered entailment. No logical relationship exists if the two questions are conflicting or contradictory. If a logical relationship is undetermined, then it is considered neutral. In an aspect, a natural language inference model 134, such as ELECTRA, T5, BART, DeBERTa is used. The model takes as input both questions of the pair and their respective factoids and classifies them into one of three classes: entailment; contradictory; or neural.

Each pair of questions that is considered contradictory or entailment and their respective factoids and segments are then output to the modification engine 138. A priority rule 140 is used to indicate the basis for ranking the conflicting documents on attributes, such as recency, type of knowledge source, the type of document, page rank, etc.

The ranked list of conflicting segments is then output to a developer for review. In another aspect, one of the documents containing the conflicting segments is eliminated from the knowledge source or flagged so that it is no longer used. The ranked list is used to select the document of a pair to eliminate or flag.

The conflicting knowledge detection system 100 uses various language models 112, 118, 128, 134. In an aspect, the language models 112, 118, 128, 134 are a deep learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

Neural transformers models are one type of deep learning model that utilize an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

Examples of a language model include the encoder and generative neural transformer models with attention (i.e., encoder-decoder, decoder) offered by OpenAI (i.e., ChatGPT and Codex models), PaLM, Chinchilla, and the Bidirectional Encoder Representations from Transformers (BERT) offered by Google, the Gemini multi-modal models of Google, LLaMa by Meta, and the Phi-3 models offered by Microsoft.

In an aspect, the generative language model 112 generates natural language text learned from patterns and structures of natural language from a vast corpus of training data. The generative language model 112 learns to generate natural language text by predicting the next word or phrase that should be in a sequence from the learned patterns and structure in the training data.

In an aspect, the generative language model is used in a beam search that uses the probability distributions output by the model to generate the natural language text. The beam search iterates over a number of timesteps generating partial sequences of natural language text at each timestep. The probability distribution is based on a conditional probability of a word in the model's vocabulary likely to follow the preceding words in a partial sequence. The probability distribution is based on the learned patterns from the training data.

At each timestep, the beam search uses the probability distribution generated by the generative language model to identify the next token or word likely to be the next word in a partial sequence. The beam search expands the search by instantiating new partial sequences of output using the selected tokens or words, including those identified by the model's probability distribution in previous time steps. The beam search continues generating new partial sequence until a termination condition occurs at which time the best partial sequence is output.

Examples of a generative language model 112 include OpenAI's GPT-4 models, Anthropic's Sonnet 3.5 model, Microsoft's Phi-3 models, and the like.

In an aspect, the question answering language model 118 is a pre-trained generative model having been fine-tuned on the SQUAD dataset. SQUAD is a dataset of over 100,000 questions and answers where each question has a corresponding answer that comes from a segment of text, or span, of the segment. The fine-tuning task enables the model to learn the relationship between a question and its corresponding answer. The question answering language model encodes the question and segment and outputs a span text contained within the segment.

The encoder 128 generates an embedding of a question. The Word2Vec and BERT models are two exemplary encoders. The Word2Vec model is trained using a large corpus of natural language text for a neural network to learn the relationships between words within its training dataset. Each word is assigned a vector representation determined by the words' context and semantic meaning and the vectors are adjusted to maximize the likelihood of correct predictions.

The BERT model is a neural encoder transformer model with attention that is trained using a masked language objective where a portion of words in a sentence are randomly masked, and the model predicts the masked words based on the surrounding context. The BERT model uses an attention mechanism that learns by considering both the left and right context of each word.

In an aspect, the natural language inference model 134 is a Sentence BERT model (SBERT) modified with a classification layer to generate the probability distribution of the classes. The SBERT is a pre-trained BERT model that is then fine-tuned on a supervised dataset of contradictory, entailment, and neural training data to learn to classify an embedding of a factoid answer into one of the three classes.

In an aspect, the language models are hosted on an external server and accessed over a network through application programming interfaces (API). A prompt, containing input to the large language model, may be issued through HTTP-based Representational State Transfer (REST) APIs. A REST API or web API is an API that conforms to the REST protocol. In the REST protocol, the remote server hosting the language model contains a publicly-exposed endpoint having a defined request and response structure. Web APIs are issued containing the prompt to the remote server that is input to the language model to perform the intended task.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Turning to FIG. 2, there is shown an exemplary method of the conflicting knowledge detection system 200. The method 200 starts by accessing a knowledge source to analyze (block 202). A request may be received to detect conflicting data within the knowledge source.

The text segmentation engine 106 reads each document in the knowledge source and extracts segments from each of the documents (block 204). A segment represents a contiguous, non-overlapping span of text that relates to a topic. The text segmentation engine 106 analyzes a document for segment boundaries or places where there is a topic shift. A topic is the theme or subject matter of a segment. The topic shift may be determined by lexical co-occurrence patterns, such as when a significant portion of the vocabulary changes in one block of contiguous text to the next block. The topic is selected from the words in the contiguous, non-overlapping span of text or segment. In an aspect, the topic is selected from the most frequently-used word or phrases. The text segmentation engine 106 partitions each document into segments, S1, . . . , Sn, 108.

The question generator 110 invokes a generative language model 112 to generate one or more questions for each segment (block 206). The question generator generates an input to the generative language model 112 that contains instructions for the model to perform the task given a set of segments. The generative language model 112 returns with one or more questions for each segment 114.

The factoid answer engine 116 invokes the question answering language model 118 to generate factoid answers for each question of each segment (block 208). The factoid answer engine 116 generates an input to the question answering language model 118 requesting the question answering model to generate questions for each segment. The input includes instructions for the model to perform the task and the questions for each segment. The question answering language model generates an output that is returned to the factoid answer engine that includes answers for each question of a segment.

The question similarity engine pairs each question in each document in the knowledge source with all other questions to find similar questions (block 210). The question similarity engine 122 compares the similarity of the pairs of questions and generates a score for each pair that represents the degree of similarity between the two questions in a pair. In one aspect, the fuzzy matching component 124 identifies the similarity based on an edit distance and in another aspect, the semantic similarity component 126 identifies the similarity using embeddings generated by an encoder 128.

In fuzzy matching, a pair of questions are compared and a score is assigned to each question indicating how similar each question is to the other question. The similarity score is based on a Levenshtein distance which is a string-matching technique using an edit distance as the basis of the score. The Levenshtein distance between two questions is the minimum number of single-character edits (insertions, deletions or substitutions) required to change one word in a question into the other question. A low score indicates that the two questions are similar.

Alternatively, the similarity of two questions may be based on semantic similarity. Semantic similarity identifies how closely the meaning of two questions are similar even when the two questions contain different words or phrases. Semantic similarity is based on an embedding of each question. An embedding is a learned vector representation for text-based tokens where tokens that have a common meaning have a common representation. A token is a smaller portion of a natural language text and can represent a word, a character, or sequence of characters. The embeddings for each question are generated by an encoder 128, such as the Word2Vec model or the BERT model.

The semantic similarity component 126 uses a distance measure to determine the similarity of the embedding for each pair of questions. The distance measure may include cosine similarity, Manhattan distance, Euclidean distance, and the like. A pair of questions with a high similarity score are considered to be similar. The pair of similar questions is then analyzed by the natural language inference engine 132.

The natural language inference engine 132 classifies the answers of each pair of similar questions as either conflicting, entailment or neutral (block 212). The natural language inference engine 132 generates an input for a natural language inference model to categorize the answers for each pair of similar questions into one of the three classes. The prompt includes instructions for the model to perform the task and the answers to the pairs of similar questions. The output from the natural language inference model is a list of conflicting answers. The natural language inference engine 132 maps the conflicting answers to the corresponding segments and documents which are then passed onto the modification engine 138 as being contradictory.

The modification engine 138 remedies the knowledge source to address the contradictory pair of conflicting documents (block 214). In an aspect, one document of the contradictory pair is eliminated based on a priority rule. The modification engine ranks the contradictory segments. The contradictory segments are ranked by the priority rule, such as the recency of the document containing the contradictory segment, the type of the knowledge source associated with the contradictory segment, or by other criteria. When the priority rule indicates recency, the older document containing the contradictory segment will be deleted from the knowledge source and the more recently published document is kept. When the priority rule indicates the type of the source of a document, such as SharePoint document, the SharePoint document containing a contradictory segment is kept while the other document containing the contradictory segment is deleted from the knowledge source.

In addition, the source of a document may be used to determine which document of a conflicting pair is deleted from the knowledge source. For example, the PageRank algorithm may be used to determine which document is eliminated from the knowledge source. The PageRank algorithm applies a score to each document obtained from a web page. A page rank score is applied to each document obtained from a web page. The page rank score is based on the number and quality of links to the web page. For example, the page rank score may be represented mathematically as follows:

$$PR(u) = \sum_{B_u} \frac{PR(v)}{L(v)},$$

where PR(u) is the page rank for web page u, where v is a web page in the set Bu, where Bu is the set of web pages linking to web page u, and L(v) is the number of links from web page v to web page u. A document associated with a higher page rank score is kept while the other document of the conflicting segment is deleted.

The knowledge source is then deployed in a target application (block 216). There are many applications that utilize knowledge sources such as applications that train language models for use in a variety of applications.

Figure 4:
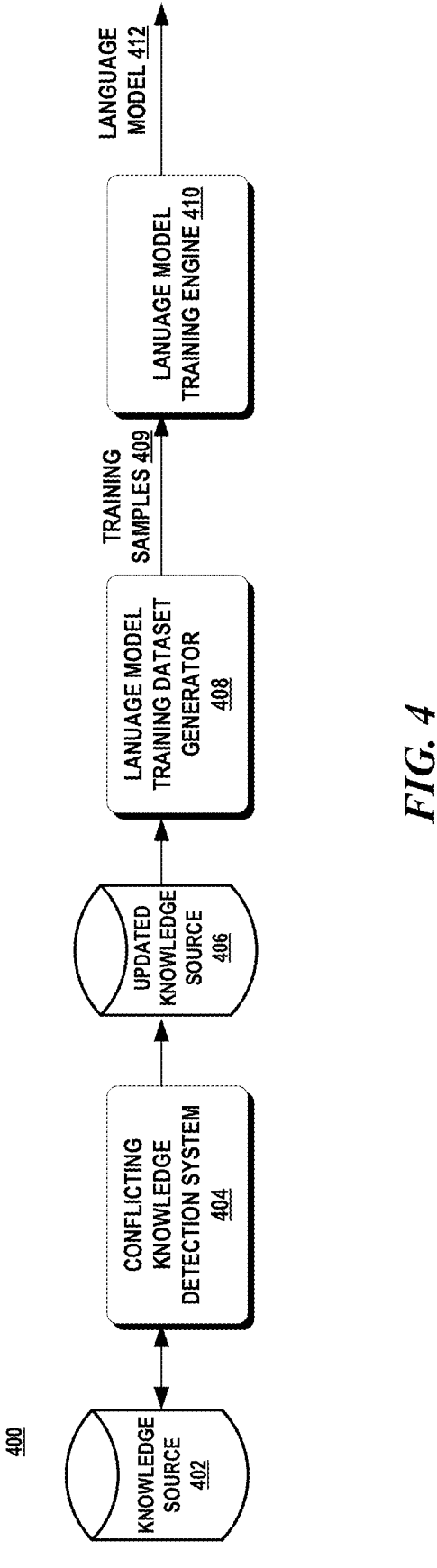
FIG. 4 illustrates an exemplary application of the system for detecting conflicting data in a knowledge source.

For example, turning to FIG. 4A, there is shown an application 400 that trains a language model 412 from data extracted from a knowledge source 402. A language model 412 is trained from training samples 409 extracted from the knowledge source. Prior to training the language model, the conflicting knowledge detection system 404 processes the documents in the knowledge source to detect any conflicting data which is removed to generate an updated knowledge base 406. A language model training dataset generator 408 uses the updated knowledge source 408 to extract training samples 409 which are used by the language model training engine 410 to retrain the language model 412.

The language model 412 may be used for a variety of applications, such as without limitation, text classification, language modeling, image captioning, machine translation, question answering, and document summarization.

Text classification refers to the labeling of sentences or documents. Text classification is used for finding and blocking spam emails. Text classification is also used for sentiment analysis where text is classified as having a negative, positive, or neutral sentiment.

Language modeling generates natural language text by predicting the next word in a sentence given the preceding words of the sentence. Image captioning generates the textual description for a given image. Machine translation translates text in one natural language into another language predicting. Question answering provides questions to a sampled text and the corresponding answers. Document summarization creates a short meaningful description of a larger document.

Exemplary Illustration

Figure 3C:
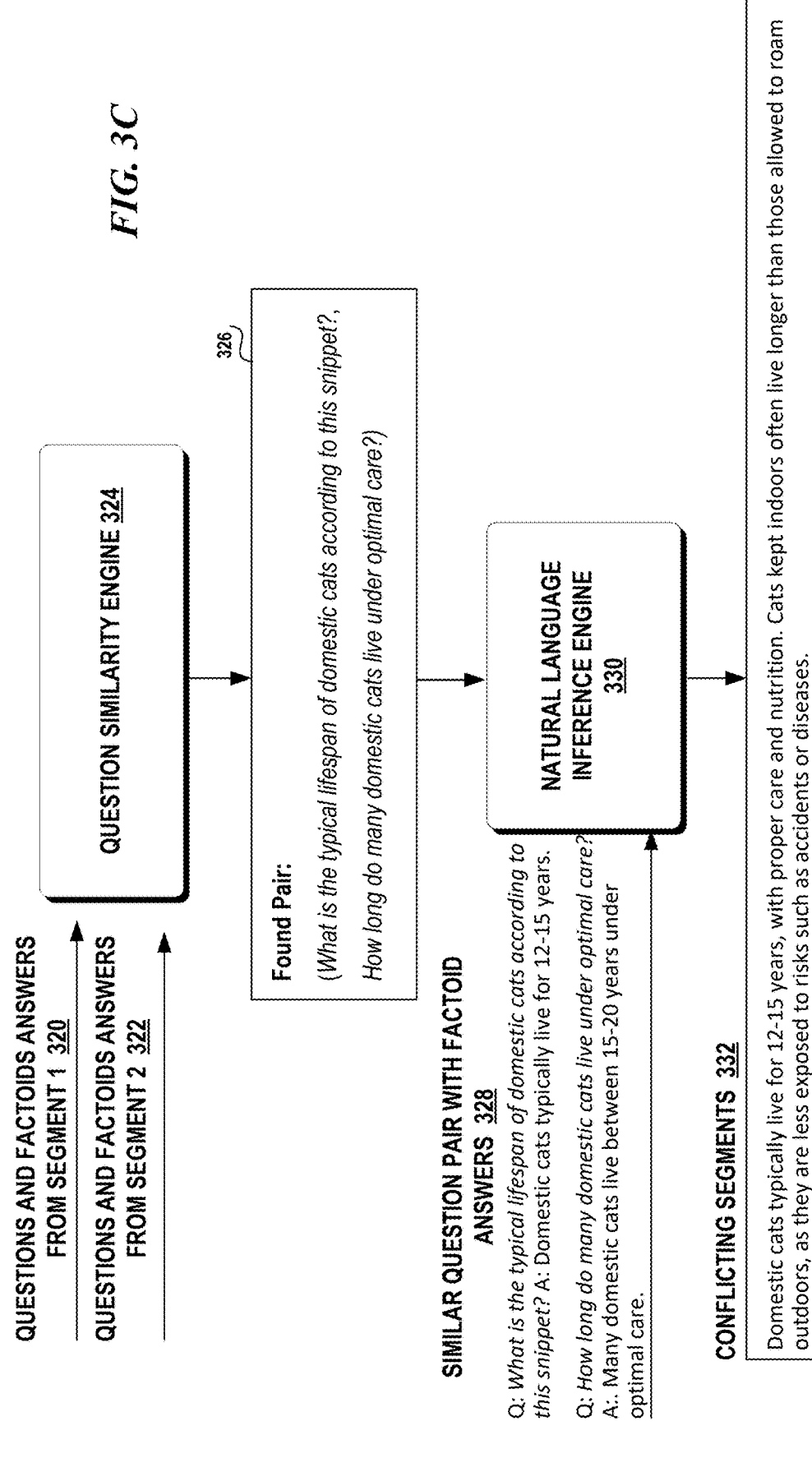

Attention now turns to FIG. 3A-3C which illustrates the detection of an exemplary conflicting document. In this example, there are two documents, document 1, 302 and document 2, 304, that contain information about domestic cats. The information about the domestic cats' lifespan is not identical. Each document emphasizes different aspects of the domestic cat's lifespan. Document 1, 302 focuses on a conservative lifespan of 12-15 years and document 2, 304, indicates the potential for cats living longer with optimal care.

The text segmentation engine 106 extracts a segment from each document. Segment 1 corresponds to document 1, 308, and contains the following text: "Domestic cats typically live for 12-15 years, with proper care and nutrition. Cats kept indoors often live longer than those allowed to roam outdoors, as they are less exposed to risks such as accidents or diseases."

Segment 2 corresponds to document 2, 310, and contains the following text: "While many domestic cats live between 15-20 years, some can reach their 20s, particularly if kept indoors and provided with a high-quality diet and regular veterinary care. Outdoor cats, however, usually have shorter lifespans."

The question generator 312 generates questions for each segment. For segment 1, the questions generated 314 include "What is the typical lifespan of domestic cats according to this snippet?" and "Why do indoor cats tend to live longer than outdoor cats?" For segment 2, the questions generated 316 include "How long do many domestic cats live under optimal care?" and "What factors contribute to the longevity of indoor cats compared to outdoor cats?" The questions point out the main idea of each segment.

Based on the questions generated by the question generator and their corresponding segments, the factoid answer engine 318 invokes a question answering language model to extract the factoids which are the answers to the questions. The factoid answers are from each corresponding segment.

The questions and factoid answers for segment 1, 320, are as follows:
1. What is the typical lifespan of domestic cats according to this snippet? Answer: Domestic cats typically live for 12-15 years.
2. Why do indoor cats tend to live longer than outdoor cats? Answer: Indoor cats live longer because they are less exposed to risks such as accidents or diseases.

The questions and factoid answers for segment 2, 322, are as follows:
1. How long do many domestic cats live under optimal care? Answer: Many domestic cats live between 15-20 years under optimal care.
2. What factors contribute to the longevity of indoor cats compared to outdoor cats? Answer: Indoor cats benefit from a controlled, safe environment, a high-quality diet, and regular veterinary care, which contributes to their longevity.

Next, the question similarity engine 324 uses an encoder to generate embeddings for the questions generated for each segment. Pairs of the questions are formed and a similarity score is generated for each pair based on the embeddings of each question. The pairs having high scores, beyond a certain threshold, are considered similar. In this example, the following two questions are considered similar: "What is the typical lifespan of domestic cats according to this snippet?" and "How long do many domestic cats live under optimal care?"

The natural language inference engine 330 takes the pair of similar questions and their corresponding factoid answers 328 and inputs them into a natural language inference model that decides if the factoids are contradictory, entailment, or neutral. In this example, the natural language inference model determines that the two segments are contradictory. This is because the information about the domestic cat's lifespan is not identical. Segment 1 indicates 12-15 years and segment 2 indicates 15-20 years.

Exemplary Operating Environment

Figure 5:
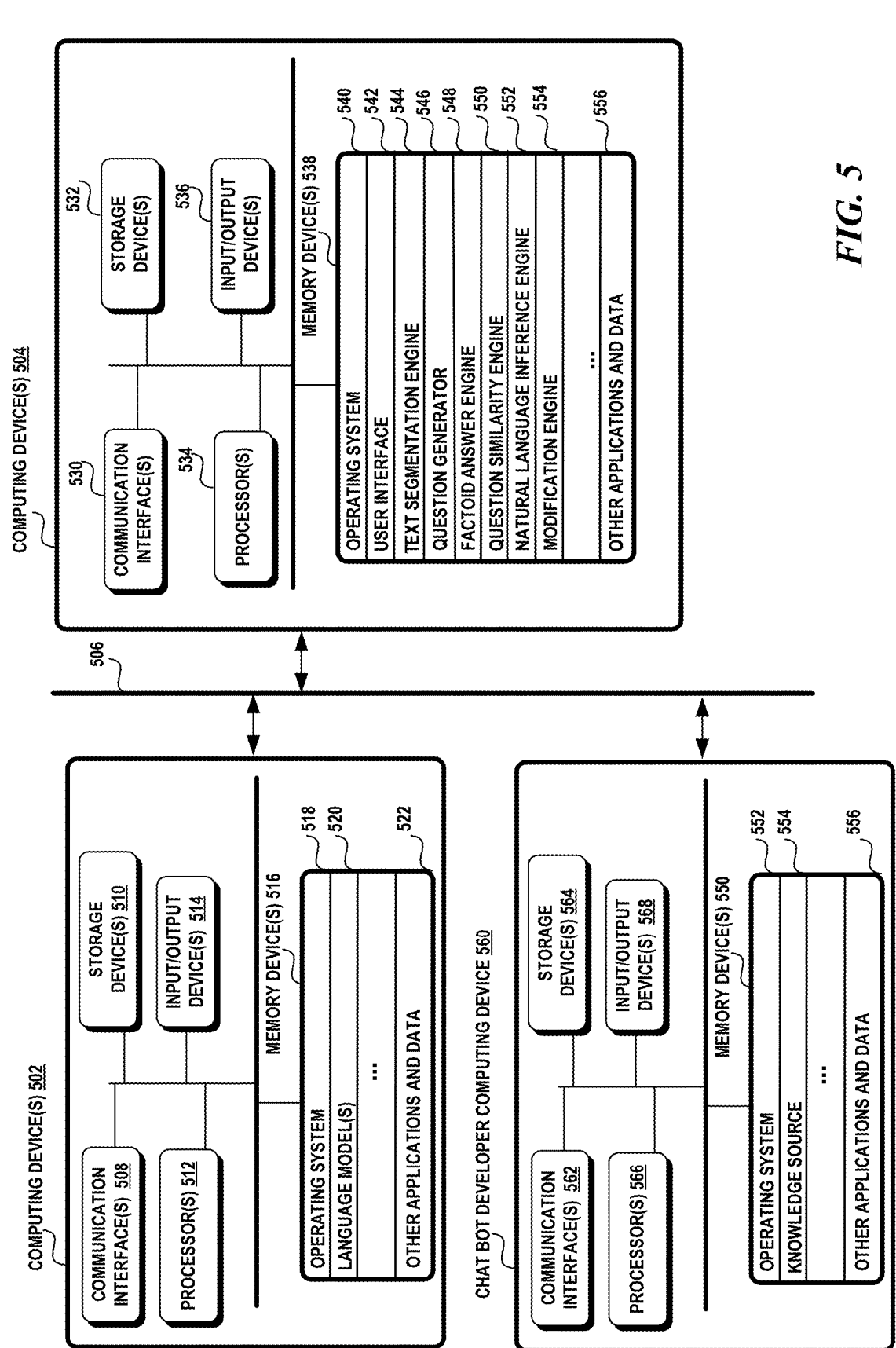
FIG. 5 is a block diagram illustrating an exemplary operating environment.

Attention now turns to a discussion of an exemplary operating environment. FIG. 5 illustrates an exemplary operating environment 500 in which one or more computing devices 502 are used to host one or more language models, one or more computing devices 504 are used to host the conflicting knowledge detection system, and another computing device 560 is used to host the knowledge source. However, it should be noted that the aspects disclosed herein are not constrained to any particular configuration of devices. In another aspect, a single computing device may host the language models, the knowledge source, and the conflicting knowledge detection system.

A computing device 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 502, 504, 570 may include one or more processors 512, 534, 566, one or more communication interfaces 508, 530, 562, one or more hardware storage devices 510, 532, 564, one or more input/output devices 514, 536, 568, and one or more memory devices 516, 538, 568. A processor 512, 534, 566 may be any commercially available or customized processor and may include dual microprocessors and multi-processor architectures. A communication interface 508, 530, 562 facilitates wired or wireless communications between the computing device and other devices. A hardware storage device 510, 532, 564 may be a computer-readable medium that does not contain propagating signals, such as modulated data signals transmitted through a carrier wave. Examples of a hardware storage device 510, 532, 564 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple hardware storage devices 510, 532, 564 in a computing device. The input/output devices 514, 536, 568 may include a keyboard, mouse, pen, voice input device, touch input device, display, speakers, printers, etc., and any combination thereof.

A memory device or memory 516, 538, 568 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 516, 538, 568 may also include one or more external hardware storage devices or remotely located hardware storage devices that do not pertain to propagated signals, such as modulated data signals transmitted through a carrier wave.

The memory device 516, 538, 568 may contain instructions, components, and data. A component is a software program that performs a specific function and is otherwise known as a module, program, engine, and/or application. The memory device 516 may include an operating system 518, language models 520, and other applications and data 522.

The memory device 538 may include an operating system 540, a user interface 542, a text segmentation engine 544, a question generator 546, a factoid answer engine 548, a question similarity engine 550, a natural language inference engine 552, a modification engine 554, and other applications and data 556.

A computing device 502, 504, 560 may be communicatively coupled via a network 506. The network 506 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 506 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of determining conflicting data in a knowledge source. The technical features associated with addressing this problem is the generation of questions for each segment of the document, the identification of similar questions within the documents, and a classification of the answers for each pair of similar questions being contradictory. In particular, the use of the language models to generate the questions, to generate answers to the questions, and to determine whether the answers to similar questions are conflicting are features that achieve a more accurate result. The language models have been trained on a large corpus of natural language text thereby providing them with the capability to produce more accurate results. The technical effect achieved is the construction of a knowledge source that includes non-conflicting data that improves the accuracy of the output generated by applications that utilize the knowledge source.

The technique disclosed herein is advantageous over prior solutions that draw one of the conflicting segments arbitrarily and uses them in an answer. This results in an erroneous response and confuses the user that relies on the output.

Knowledge sources are the bedrock for training language models. As the need for more neural network trained models increases, so too does the need for data sources that have reliable and consistent data. This increases the need for a flexible, adaptable, inexpensive solution to detect contradictory data in a knowledge source and to remedy the knowledge source. The technique described herein uses machine learning models which are trained to perform specific tasks that cannot be performed readily by a human.

One of ordinary skill in the art understands that the technical effects are the purpose of a technical embodiment. The mere fact that a calculation is involved in an embodiment does not remove the presence of the technical effects or alter the concrete and technical nature of the embodiments. Operations used to invoke the machine learning models are clearly digital. The human mind cannot interface directly with a CPU or network interface card, or other processor, or with RAM or other digital storage, to read or write the necessary data and perform the necessary operations on digital values in the manner disclosed herein.

The embodiments are also presumed to be capable of operating at scale, within tight timing constraints in production environments, or in testing labs for production environments as opposed to being mere thought experiments.

CONCLUSION

A system is disclosed, comprising: a processor; and a memory that stores a program that is configured to be executed by the processor. The program comprises instructions to perform acts that: obtain a plurality of documents of a knowledge source; partition each document of the plurality of documents of the knowledge source into a plurality of segments, wherein a segment comprises a non-overlapping, contiguous block of natural language text that pertains to a particular topic; cause a language model to generate at least one question for each segment of the plurality of segments; cause the language model to generate a factoid answer for the at least one question of each segment of the plurality of segments; find a pair of similar questions from the at least one question of each segment of the plurality of segments; cause the language model to determine whether the factoid answers for the pair of similar questions are contradictory; and upon the language model determining that the factoid answers for the pair of similar questions have conflicting answers, eliminate a select document associated with a select one of the contradictory pair of similar questions from the knowledge source.

In an aspect, wherein find a pair of similar questions from the at least one question for each segment of the plurality of segments is based on matching an embedding of each question of each segment of the plurality of segments with an embedding of all other questions of each segment of the plurality of segments.

In an aspect, wherein find a pair of similar questions from the at least one question for each segment of the plurality of segments is based on an edit distance between each question of each segment of the plurality of segments.

In an aspect, the program comprises instructions to perform acts that: rank each document associated with the contradictory pair in accordance with a priority rule; and select one document associated with the contradictory pair to eliminate from the knowledge source based on the priority rule.

In an aspect, the priority rule is based on a recency of the documents of the contradictory pair. In an aspect, the priority rule is based on a type of the documents of the contradictory pair or a type of a source of the documents of the contradictory pair. In an aspect, the priority rule is based on a page rank of a website from which the documents of the contradictory pair originated.

A computer-implemented method is disclosed comprising: accessing a knowledge source comprising a plurality of documents; generating a plurality of segments from the plurality of documents, wherein a segment comprises a non-overlapping, contiguous block of natural language text that pertains to a select topic; causing a language model to generate a plurality of questions for each segment of the plurality of segments; causing the language model to generate a factoid answer for each of the plurality of questions of each segment of the plurality of segments; generating pairs of similar questions from the plurality of questions for each segment of the plurality of segments based on matching words in select ones of the plurality of questions; causing the language model to determine whether the factoid answers for the pairs of similar questions are contradictory based on a non-existence of a logical relationship between the answers for each pair of similar questions; and selecting one of the documents of a contradictory pair of similar questions to remedy in the knowledge source.

In aspect, the computer-implemented method further comprises: ranking documents of the contradictory pair of similar questions based on recency; and eliminating a select one of the documents of the contradictory pair of similar questions having a longest recency.

In an aspect, the computer-implemented method further comprises: ranking the documents of the contradictory pair based on a priority rule; and eliminating a select one of the documents of the contradictory pair of similar questions based on the priority rule.

In an aspect, the priority rule comprises type of source of the documents of the contradictory pair of similar questions or type of the documents of the contradictory pair of similar questions.

In an aspect, the computer-implemented method further comprises: computing a page rank for a website source of each document of the contradictory pair of similar questions; and eliminating a select one of the documents of the contradictory pair of similar questions having a lowest page rank score.

In an aspect, wherein generating a plurality of segments from the plurality of documents further comprising: identifying a segment from boundaries between text blocks based on topic shifts and lexical cohesion.

In an aspect, wherein generating pairs of similar questions from the plurality of questions for each segment of the plurality of segments is based on matching an embedding of a first question of a pair of similar questions with an embedding of a second question of the pair of similar questions.

In an aspect, the computer-implemented method further comprises: updating the knowledge source to remedy the documents of the conflicting pair of similar questions; and generating a training dataset from the updated knowledge source, wherein the training dataset is used to train the language model.

A hardware storage device having stored thereon computer executable instructions that are structured to be executable by a processor of a computing device to thereby cause the computing device to perform actions that: access a knowledge source comprising a plurality of documents; identify at least one pair of documents of the plurality of documents containing conflicting information by performing actions that: partition the plurality of documents into a plurality of segments, wherein a segment comprises a non-overlapping contiguous portion of text belonging to a topic; cause a language model to generate a plurality of questions for each segment of the plurality of segments; cause the language model to generate an answer for each of the plurality of questions for each segment of the plurality of segments; identify at least one pair of similar questions from the plurality of questions for each segment of the plurality of segments, wherein a pair of similar questions is based on matching embeddings of each question of the plurality of questions or based on an edit distance of changes between pairs of questions of the plurality of questions; and cause the language model to determine that the answers to the at least one pair of similar questions produce results that are conflicting; and alter the knowledge source to eliminate a select document associated with the contradictory pair of the at least one pair of similar questions.

In an aspect, wherein identify the at least one pair of similar questions from the plurality of questions for each segment of the plurality of segments is based on matching an embedding of each question of the plurality of questions for each segment of the plurality of segments with all other questions for the plurality of questions for each segment of the plurality of segments.

In an aspect, the hardware storage device has stored thereon computer executable instructions that are structured to be executable by a processor of a computing device to thereby cause the computing device to perform actions that: choose the select document associated with the contradictory pair to eliminate from the knowledge source based on a page rank of the web site from which the select document associated with the contradictory pair originated.

In an aspect, the hardware storage device has stored thereon computer executable instructions that are structured to be executable by a processor of a computing device to thereby cause the computing device to perform actions that: select the select document associated with the contradictory pair to eliminate from the knowledge base based on recency of the select document, source of the select document, or type of the select document.

In aspect, the hardware storage device has stored thereon computer executable instructions that are structured to be executable by a processor of a computing device to thereby cause the computing device to perform actions that: choose the select document associated with the contradictory pair to eliminate from the knowledge source based on a type of the documents of the contradictory pair or a type of a source of the documents of the contradictory pair.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the techniques disclosed herein may be applied to any data included in a prompt and is not limited to ordering the in-context data.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:

a processor; and a memory that stores a program that is configured to be executed by the processor, wherein the program comprises instructions to perform acts that:

obtain a plurality of documents of a knowledge source;

partition each document of the plurality of documents of the knowledge source into a plurality of segments, wherein a segment comprises a non-overlapping, contiguous block of natural language text that pertains to a particular topic;

cause a language model to generate at least one question for each segment of the plurality of segments;

cause the language model to generate a factoid answer for the at least one question of each segment of the plurality of segments;

find a pair of similar questions from the at least one question of each segment of the plurality of segments;

cause the language model to determine whether the factoid answers for the pair of similar questions are contradictory, whereby the pair of similar questions are a contradictory pair of similar questions; and upon the language model determining that the pair of similar questions are a contradictory pair of similar questions, eliminate a select document associated with a select one of the contradictory pair of similar questions from the knowledge source.

2. The system of claim 1, wherein find a pair of similar questions from the at least one question for each segment of the plurality of segments is based on matching an embedding of each question of each segment of the plurality of segments with an embedding of all other questions of each segment of the plurality of segments.

3. The system of claim 1, wherein find a pair of similar questions from the at least one question for each segment of the plurality of segments is based on an edit distance between each question of each segment of the plurality of segments.

4. The system of claim 1, wherein the program comprises instructions to perform acts that:

rank each document associated with the contradictory pair of similar questions in accordance with a priority rule; and select one document associated with the contradictory pair of similar questions to eliminate from the knowledge source based on the priority rule.

5. The system of claim 4, wherein the priority rule is based on a recency of the documents of the contradictory pair of similar questions.

6. The system of claim 4, wherein the priority rule is based on a type of the documents of the contradictory pair of similar questions or a type of a source of the documents of the contradictory pair of similar questions.

7. The system of claim 4, wherein the priority rule is based on a page rank of a website from which the documents of the contradictory pair of similar questions originated.

8. A computer-implemented method comprising:

accessing a knowledge source comprising a plurality of documents;

generating a plurality of segments from the plurality of documents, wherein a segment comprises a non-overlapping, contiguous block of natural language text that pertains to a select topic;

causing a language model to generate a plurality of questions for each segment of the plurality of segments;

causing the language model to generate a factoid answer for each of the plurality of questions of each segment of the plurality of segments;

generating pairs of similar questions from the plurality of questions for each segment of the plurality of segments based on matching words in select ones of the plurality of questions;

causing the language model to determine whether the factoid answers for the pairs of similar questions are contradictory based on a non-existence of a logical relationship between the answers for each pair of similar questions, whereby each pair of similar questions is a contradictory pair of similar questions; and selecting one of the documents of a contradictory pair of similar questions to remedy in the knowledge source.

9. The computer-implemented method of claim 8, comprising:

ranking documents of the contradictory pair of similar questions based on recency; and eliminating a select one of the documents of the contradictory pair of similar questions having a longest recency.

10. The computer-implemented method of claim 8, comprising:

ranking the documents of the contradictory pair of similar questions based on a priority rule; and eliminating a select one of the documents of the contradictory pair of similar questions based on the priority rule.

11. The computer-implemented method of claim 10, wherein the priority rule comprises type of source of the documents of the contradictory pair of similar questions or type of the documents of the contradictory pair of similar questions.

12. The computer-implemented method of claim 8, comprising:

computing a page rank for a website source of each document of the contradictory pair of similar questions; and eliminating a select one of the documents of the contradictory pair of similar questions having a lowest page rank score.

13. The computer-implemented method of claim 8, wherein generating a plurality of segments from the plurality of documents further comprising:

identifying a segment from boundaries between text blocks based on topic shifts and lexical cohesion.

14. The computer-implemented method of claim 8, wherein generating pairs of similar questions from the plurality of questions for each segment of the plurality of segments is based on matching an embedding of a first question of a pair of similar questions with an embedding of a second question of the pair of similar questions.

15. The computer-implemented method of claim 8, further comprising:

updating the knowledge source to remedy the documents of the contradictory pair of similar questions; and generating a training dataset from the updated knowledge source, wherein the training dataset is used to train the language model.

16. A hardware storage device having stored thereon computer executable instructions that are structured to be executable by a processor of a computing device to thereby cause the computing device to perform actions that:

access a knowledge source comprising a plurality of documents;

identify at least one pair of documents of the plurality of documents containing conflicting information by performing actions that:

partition the plurality of documents into a plurality of segments, wherein a segment comprises a non-overlapping contiguous portion of text belonging to a topic;

cause a language model to generate a plurality of questions for each segment of the plurality of segments;

cause the language model to generate an answer for each of the plurality of questions for each segment of the plurality of segments;

identify at least one pair of similar questions from the plurality of questions for each segment of the plurality of segments, wherein a pair of similar questions is based on matching embeddings of each question of the plurality of questions or based on an edit distance of changes between pairs of questions of the plurality of questions; and cause the language model to determine that the answers to the at least one pair of similar questions produce results that are conflicting, whereby each of the at least one pair of similar questions is a contradictory pair of similar questions; and alter the knowledge source to eliminate a select document associated with a question of a contradictory pair of similar questions.

17. The hardware storage device of claim 16, wherein identify the at least one pair of similar questions from the plurality of questions for each segment of the plurality of segments is based on matching an embedding of each question of the plurality of questions for each segment of the plurality of segments with all other questions for the plurality of questions for each segment of the plurality of segments.

18. The hardware storage device of claim 16, having stored thereon computer executable instructions that are structured to be executable by a processor of a computing device to thereby cause the computing device to perform actions that:

choose the select document associated with a question of the contradictory pair of similar questions to eliminate from the knowledge source based on a page rank of the web site from which the select document originated.

19. The hardware storage device of claim 16, having stored thereon computer executable instructions that are structured to be executable by a processor of a computing device to thereby cause the computing device to perform actions that:

select the select document associated with a question of the contradictory pair of similar questions to eliminate from the knowledge base based on recency of the select document, source of the select document, or type of the select document.

20. The hardware storage device of claim 16, having stored thereon computer executable instructions that are structured to be executable by a processor of a computing device to thereby cause the computing device to perform actions that:

choose the select document associated with a question of the contradictory pair of similar questions to eliminate from the knowledge source based on a type of the documents of the contradictory pair of similar questions or a type of a source of the documents of the contradictory pair of similar questions.

\* \* \* \* \*